United States Patent [19]

Volkonsky

[11] Patent Number: 6,073,150

[45] Date of Patent: *Jun. 6, 2000

[54] APPARATUS FOR DIRECTING A PARALLEL PROCESSING COMPUTING DEVICE TO FORM AN ABSOLUTE VALUE OF A SIGNED VALUE

[75] Inventor: Vladimir Yu. Volkonsky, Moscow, Russian Federation

[73] Assignee: Sun Microsystems, Inc., Palo Alto, Calif.

[*] Notice: This patent is subject to a terminal disclaimer.

[21] Appl. No.: 08/880,632

[22] Filed: Jun. 23, 1997

[51] Int. Cl.[7] .................................. G06F 7/38; G06F 7/50
[52] U.S. Cl. ........................ 708/201; 708/209; 708/505; 708/670
[58] Field of Search ..................... 364/715.012, 715.011, 364/715.08, 768, 748.11

[56] References Cited

U.S. PATENT DOCUMENTS

| | | | |
|---|---|---|---|
| 5,075,879 | 12/1991 | Anderson | 364/715.012 |
| 5,146,419 | 9/1992 | Miyoshi | 364/748.11 |
| 5,148,386 | 9/1992 | Hori | 364/768 |
| 5,216,628 | 6/1993 | Mizutani et al. | 364/715.011 |
| 5,303,174 | 4/1994 | Okamoto | 364/748.11 |
| 5,497,340 | 3/1996 | Uramoto et al. | 364/745 |
| 5,533,185 | 7/1996 | Lentz et al. | 395/162 |
| 5,539,685 | 7/1996 | Otaguro | 364/757 |

OTHER PUBLICATIONS

Sun Microsystems "The UltraSPARC Processor—Technology White Paper, The UltraSPARC Architecture" Nov. 14, 1995.

*Primary Examiner*—Hassan Kizou
*Assistant Examiner*—Douglas S. Lee
*Attorney, Agent, or Firm*—D'Alessandro & Ritchie

[57] ABSTRACT

In the present invention, a method for directing parallel processing computing device to perform the operation of setting a signed value of N bits to an absolute value comprises the steps of: performing an arithmetic shift right of N-1 bit to form a bit mask; performing an exclusive-OR logical operation with the signed value of N bits and the bit mask to form a result; and subtracting the bit mask from the result of the exclusive-OR logical operation to form the absolute value of the signed value of N bits. Further, an apparatus for parallel processing a signed value to form an absolute value comprises: means for performing an arithmetic shift right of N-1 bit to form a bit mask; means for performing an exclusive-OR logical operation with the signed value of N bits and the bit mask to form a result; and means for subtracting the bit mask from the result of the exclusive-OR logical operation to form the absolute value of the signed value of N bits.

3 Claims, 3 Drawing Sheets

6,073,150

APPARATUS FOR DIRECTING A PARALLEL PROCESSING COMPUTING DEVICE TO FORM AN ABSOLUTE VALUE OF A SIGNED VALUE

RELATED APPLICATION DATA

This application is related to co-pending application Ser. No. 08/880,626, filed Jun. 23, 1997, and Entitled "METHOD AND APPARATUS FOR DIRECTING A PARALLEL PROCESSING COMPUTING DEVICE TO FORM AN ABSOLUTE VALUE OF A SIGNED VALUE", by inventor Vladimir Volkonsky, assignor to Sun Microsystems, a Delaware Corporation.

BACKGROUND OF THE INVENTION

1. Field Of The Invention

The present invention relates to computers that have a superscalar architecture or that can execute multiple instructions in parallel. More specifically, the present invention relates to the implementation of the operation of generating the absolute value of a signed value by a computing device using instructions processed in parallel.

2. The Prior Art

In computing devices, there is an increasing need for better performance in the implementation of video signal processing functions to meet the demand for video conferencing, 3-D visualization, animation, electronic publishing, video service, etc. To adequately provide these graphics capabilities, the computing device must signal process very large quantities of data with a very fast throughput to implement real time processing of video images, as well as image compression and decompression. For example, in a "multi-media" desktop, it is imperative that processors accommodate high speed graphics, video processing, and image compression/decompression to execute multi-media applications.

The amount of information contained in graphics or video signals for to manipulation by signal processing is not trivial. For example, a digital NTSC signal generates approximately 10.4 million pixels per second. Since each pixel contains information for three colors, the total amount of information is more than 30 million pieces of data per second. At a CPU clock rate of 200 megahertz, only 20 clock cycles are available for processing each pixel. This results in less than 7 clock cycles available per color component.

It is difficult to implement real time processing of video images, as well as image compression and decompression because graphics and video processing may include several operations on a single color component of a single pixel. Accordingly, sheer throughput is not enough for efficient manipulation of the video image in real time.

This throughput problem can be lowered by processing the graphics or video data in parallel. For example, computing devices having a superscalar architecture are able to execute several instructions concurrently. As such, a single signal processing operation may be executed in one clock cycle because the instructions directing the computing device to implement the signal processing operation may be executed in parallel. The increase in speed achieved by the superscalar architecture, however, depends upon the fact that the instructions directing the computing device to perform the desired signal processing operation are capable of being executed in parallel.

When the computing device is directed to implement the desired operation with a branch instruction, the advantages of the superscalar architecture provided by parallel processing are not being used to their fullest extent even when the superscalar architecture provides for dynamic branch prediction. When a branch instruction is one of the instructions employed to direct the computing device to perform an operation, the instructions following the branch instruction are dependent upon the branch instruction, and cannot be executed until the branch has been executed.

Further, it does not matter whether the branch is taken or not, because the branch instruction must still first be executed prior to the execution of the following instructions. Accordingly, directing a computing device with a superscalar architecture to perform a signal processing operation by using a branch instruction is not an effective way to increase the signal processing throughput of the computing device.

In the real time processing of video images, as well as image compression and decompression video signal processing, there are several operations that the computing device is repeatedly instructed to perform. Because these operations are performed repeatedly, the instructions that are used to direct the computing device to perform these operation should be those that direct the computing device to perform the desired operation most efficiently. To do otherwise, will significantly degrade the signal processing capability of the computing device.

In real time processing of video images, one of the operations that must be made repeatedly in performing digital signal processing is setting signed values to their absolute value. For example, the dominant operation for video compression algorithms such as MPEG 2 or H261 is motion estimation. Most motion estimation takes advantage of the minimal changes in the position of images from one frame to the next. To perform motion estimation, hundreds of comparisons for a region of an image to determine a motion value that minimizes the estimation error must be made. The error is calculated by summing the differences for each pixel in the region between a reference frame and an a newer frame. The signal processing required to determine the area error includes the performance of subtractions, additions, loads, and the setting of assigned values to their absolute values.

In the prior art, the instructions directing the computing device to perform the operation of setting a signed number to its absolute value have included a branch instruction. As discussed above, using a branch instruction to direct a computing device that can execute instructions in parallel is inefficient, and as such, does not take advantage of the critical increase in the throughput of data in video signal processing provided by a parallel processing computing device. Accordingly, there is need to implement the operation of generating the absolute value of a signed value by a computing device using instructions that can be processed in parallel.

BRIEF DESCRIPTION OF THE INVENTION

According to the present invention, a method for directing parallel processing computing device to perform the operation of setting a signed value of N bits to an absolute value comprises the steps of: performing an arithmetic shift right of N-1 bits to form a bit mask; performing an exclusive-OR logical operation with the signed value of N bits and the bit mask to form a result; and subtracting the bit mask from the result of the exclusive-OR logical operation to form the absolute value of the signed value of N bits.

Further, according to the present invention, a system for parallel processing a signed value to form an absolute value comprises: means for performing an arithmetic shift right of N-1 bits to form a bit mask; means for performing an exclusive-OR logical operation with the signed value of N bits and the bit mask to form a result; and means for subtracting the bit mask from the result of the exclusive-OR logical operation to form the absolute value of the signed value of N bits.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

According to the present invention, a computing device is directed to perform the desired operation of setting a signed value to its absolute value by instructions that may be processed in parallel. Unlike the prior art, the computing device is directed to perform the desired operation without using a branch instruction. As a result, the computing device can be directed to perform the desired operation in a manner which increases the throughput of the computing device. The increase in throughput is of critical importance, for example, in 2-D, 3-D image and video signal processing, MPEG-2 image compression/decompression, and audio processing. Those of ordinary skill in the art will readily appreciate that the present invention may be employed in other areas of data processing as well.

Figure 1:
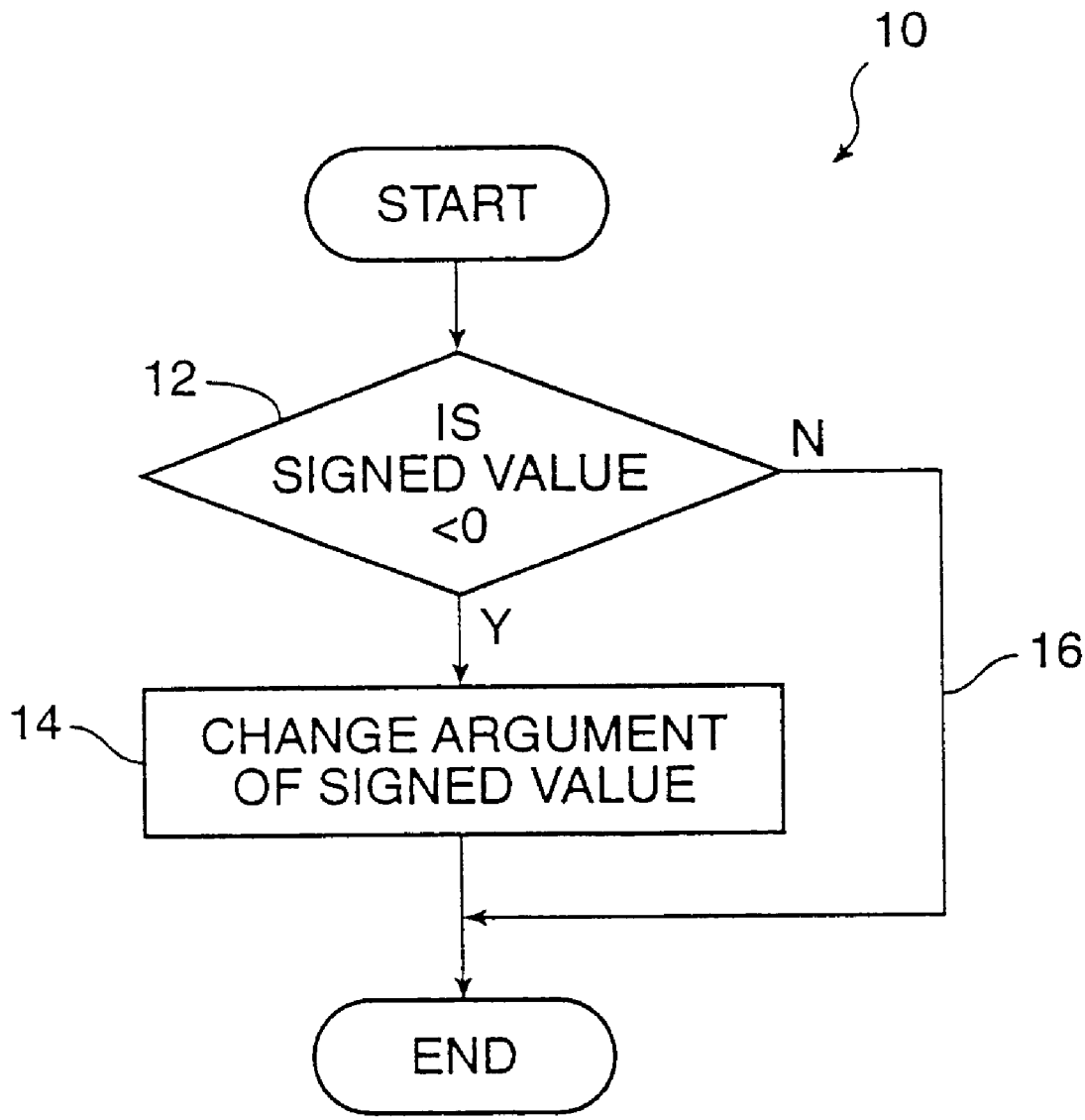
FIG. 1 illustrates a flow diagram of the instructions for directing a microprocessor to perform the operation of setting a signed number to its absolute value according the prior art.

In the prior art, the desired operation of setting a signed number to its absolute value included a branch instruction. Referring now to FIG. 1, flow diagram 10 of the operation of setting a signed number to its absolute value as performed in the prior art is illustrated.

At step 12, a signed value loaded previously into an internal register of a microprocessor or other computing device is compared with zero during a first clock cycle. Due to the compare in step 12, a branch instruction is executed by the computing device. At step 14, if the signed value is less then zero, then the computing device will change the argument of the signed value stored in the internal register. Changing the sign of the argument by the computing device requires at least another clock cycle. Otherwise at step 16, the instructions for changing the argument of the signed value stored in the internal register are bypassed. The execution of the bypass of the changing of the argument of the signed value in the internal register at step 16 requires as many clock cycles as the execution of the instructions at step 14.

According to the present invention, the desired operation of setting a signed number to its absolute value is performed without a branch instruction. Instead, the instructions directing the computing device to perform the desired operation are performed in parallel. An exemplary computing device suitable for use according to the present invention is an UltraSPARC general-purpose microprocessor manufactured by Sun Microsystems of Mountain View, Calif. it will be appreciated, however, by those of ordinary skill in the art that other microprocessors capable of executing instructions in parallel are suitable for use according to the present invention.

Figure 2:
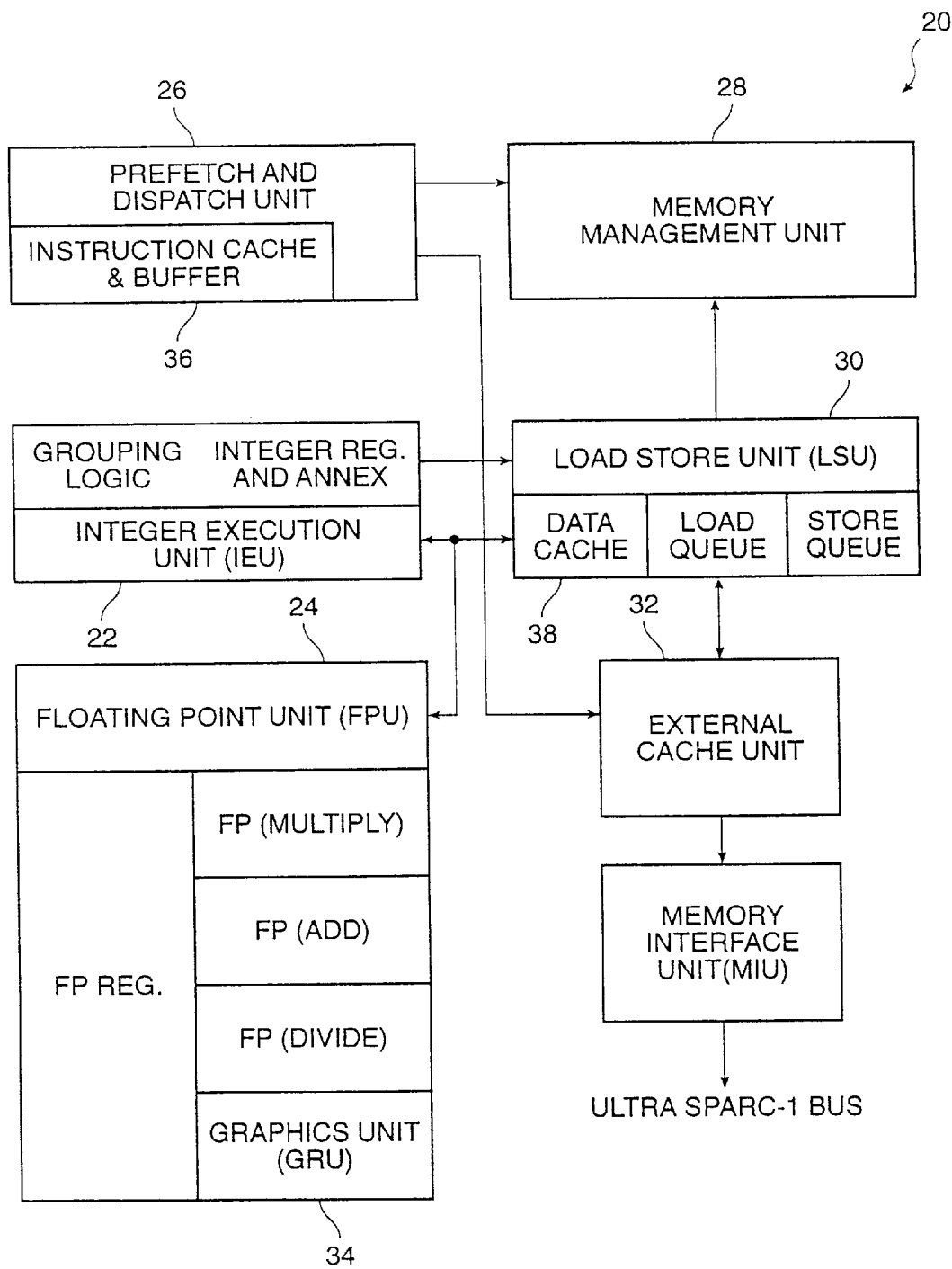
FIG. 2 illustrates a block diagram of the CPU architecture of a microprocessor suitable for use according to the present invention.

In FIG. 2, a block diagram of the CPU architecture 20 of UltraSRARC microprocessor 20 is illustrated. The CPU architecture 20 comprises an Integer Execution Unit 22, a Floating-point Unit 24, a Prefetch and Dispatch Unit 26, a Memory Management Unit 28, a Load Store Unit 30, an External Cache Unit 32, a Graphics Unit 34, an Instruction Cache 36 and a Data Cache 38. Although the CPU architecture 20 has a Graphics Unit 34 with a dedicated instruction set for processing of video signals, MPEG-2 image compression/decompression, and other video or image processing, the parallel processing capabilities of the Integer Execution and Floating-point Units 22 and 24 may also be directed to perform desired video signal processing operations in parallel.

In the preferred embodiment, the UltraSPARC CPU architecture 20 employs a double-instruction-issue pipeline with nine stages: fetch, decode, grouping, execution, cache access, load miss, integer pipe wait, trap resolution, and write-back. Although these nine stages imply that the latency of most instructions is nine clock cycles, at any given time as many as nine instructions can execute simultaneously, producing an overall rate of execution of one clock cycle per instruction in many cases. Since the operation of these stages is well known to those of ordinary skill in the art, a detailed description of each of the nine stages of the pipeline in the CPU architecture 20 will not be given herein to avoid overcomplicating the disclosure and obscuring the present invention. However, a overview of the pipeline will be described herein.

The first stage of the pipeline is a fetch from the Instruction Cache 36. In the second stage, instructions are decoded and placed in the instruction buffer. In the third stage, up to four instructions are grouped together and dispatched. In the fourth stage, integer instructions are executed and virtual addresses calculated during the execution stage. It should be appreciated that each Integer Execution Unit 22 comprise two arithmetic logic units (ALUs) for arithmetic, logic, and shift operations. In the fifth stage, the Data Cache 38 is accessed, cache hits and misses are determined, and branches are resolved. In the sixth stage, if a cache miss was detected, the load miss enters a load buffer. In the seventh and eighth stages, the integer pipe waits for the floating point/graphics pipe to fill and traps are resolved. In the ninth stage, all results are written to the register files and instructions are committed. From this overview it can be observed that although latencies may occur, once the pipeline is filled, execution proceeds at up to four instructions per processor per Integer Execution Unit 22.

Figure 3:
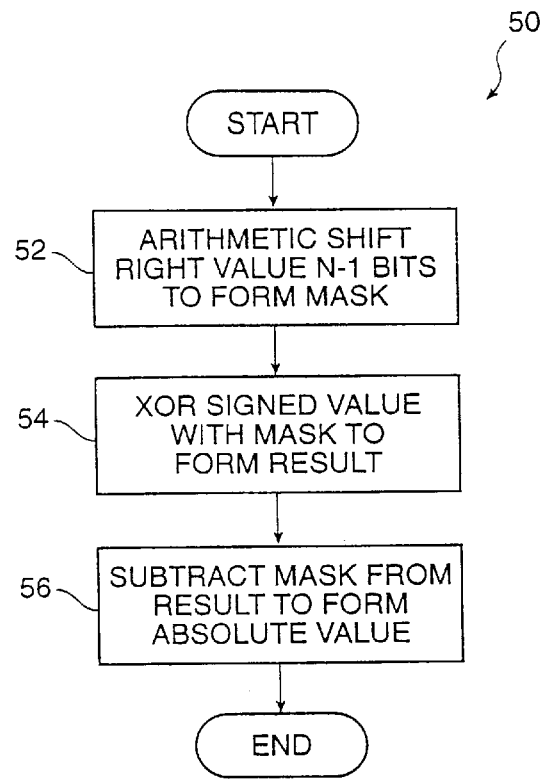
FIG. 3 illustrates a flow diagram of the instructions for directing a microprocessor to perform the operation of setting a signed number to its absolute value according to the present invention.

According to the preferred embodiment of the present invention, the UltraSPARC processor is directed to perform the desired operation of setting a signed value to its absolute value by instructions that may be processed in parallel by the UltraSPARC processor. In FIG. 3, a flow diagram 50 of the instructions according to the present invention directing the processor to perform the desired operation is illustrated. It should be observed that only arithmetic and logic instructions are executed by the processor, thereby avoiding the branch instructions of the prior art.

Turning now to FIG. 3, at step 52, a signed value loaded previously into an internal register of N bits of the UltraSPARC processor is arithmetically shifted N-1 bits to the right to obtain a bit mask. In 2's complement representation of signed numbers, well known to those of ordinary skill in the art, the most significant bit is 0 for positive values and 1 for negative values. Accordingly, an arithmetic shift right of N-1 bits will form a bit mask of all 0's when the signed value loaded previously into the internal register of N bits is positive and will form a bit mask of all 1's when the signed value loaded previously into the internal register of N bits is negative.

At step 54, the bit mask formed in step 52 is exclusively OR'ed (XOR) logically, as well understood by those of ordinary skill in the art, with the signed value loaded into the internal register of N bits. In a first instance, when the bit mask formed in step 52 is all 0's, the result of the of the XOR instruction is the same as the signed value as was initially loaded into the register of N bits. In a second instance, when the bit mask formed in step 52 is all 1's, the result of the of the XOR instruction is the inversion of the signed value as was initially loaded into the register of N bits. In other words, in the inversion, each of the 0's of the signed value as was initially loaded into the register of N bits is made a 1, and each of the 1's of the signed value as was initially loaded into the register of N bits is made a 0.

At step 56, the bit mask formed in step 52 is subtracted from the result formed in step 54. In a first instance, when the bit mask is all 0's this has the effect of subtracting 0 from the result formed in step 54. As will be appreciated, the absolute value of a signed positive value is simply the positive signed value itself. In a second instance, when the bit mask is all 1's, the subtraction has the effect of adding 1 to the result formed in step 54. According to the present invention, when the N bits of a negative signed value are inverted and 1 is added to the result, the absolute value of a negative signed value is formed.

According to other alternative embodiments, the present invention may be implemented in a Field Programmable Gate Architecture (FPGA) or by an integrated circuit design program such as VHDL used to create an equivalent integrated circuit as is known to those of ordinary skill in the art. Those of ordinary skill in the art will also readily recognize that the construction of logic circuits to perform the arithmetic shift operations, XOR operations, and subtraction operations to implement the present invention are known in the art.

Figure 4:
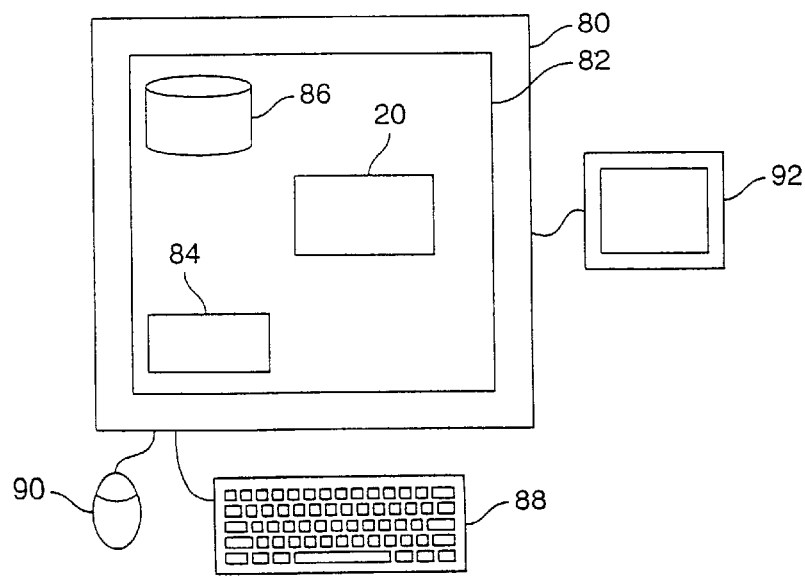
FIG. 4 is a block diagram of a programmed computer system (or device) for performing the functions used in the presently preferred embodiment of the present invention.

FIG. 4 is a block diagram of a programmed computer system 80 for performing the functions used in the presently preferred embodiment of the present invention. Computer system uses UltraSPARC microprocessor 20 (see, FIG. 2) to provide the embodiments of the present invention when used under program control. The use of UltraSPARC microprocessor 20 in computer system 80 is not intended to be limiting in any way. Other types of microprocessors may be used, such as superscalar pipelined processors suitable for running a computer program configured to provide the functional features of the present invention described above. Computer system 80 also includes an operating system 82, data memory 84, mass storage 86, and input/output devices including a keyboard 88, mouse 90 or other pointing device, and a device monitor 92.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An apparatus for parallel processing a signed value to form an absolute value comprising:

a programmed computing device for:

performing an arithmetic shift right of N-1 bits on the signed value of N bits to form a bit mask;

performing an exclusive-OR logical operation with the signed value of N bits and said bit mask to form a result; and subtracting said bit mask from said result of said exclusive-OR logical operation to form the absolute value of the signed value of N bits.

2. A computer system for processing a signed value to form an absolute value comprising:

means for performing an arithmetic shift right of N-1 bits on the signed value of N bits to form a bit mask;

means for performing an exclusive-OR logical operation with the signed value of N bits and said bit mask to form a result; and means for subtracting said bit mask from said result of said exclusive-OR logical operation to form the absolute value of the signed value of N bits.

3. An article of manufacture, comprising:

a computer usable medium having a computer readable program code means embodied therein for causing a computer system to form an absolute value from a signed value, the article of manufacture comprising:

computer-readable program means for performing an arithmetic shift right of N-1 bits on the signed value of N bits to form a bit mask;

computer-readable program means for performing an exclusive-OR logical operation with the signed value of N bits and said bit mask to form a result; and computer-readable program means for subtracting said bit mask from said result of said exclusive-OR logical operation to form the absolute value of the signed value of N bits.

* * * * *

UNITED STATES PATENT AND TRADEMARK OFFICE
CERTIFICATE OF CORRECTION

PATENT NO: 6,073,150
DATED: June 6, 2000
INVENTOR(S): Vladimir Yu Volkonsky

It is certified that error appears in the above-identified patent and that said Letter Patent are hereby corrected as shown below:

> In the abstract at lines 5 and 12 delete "N-1 bit" and insert - - N-1bits- -.
> In column 2 line 37 delete "reference frame and an a" and insert - - referenced frame and a- - .
> In column 4 line 40 delete "However, a overview" and insert - - However, an overview- -

Signed and Sealed this

Seventeenth Day of April, 2001

*Attest:*

NICHOLAS P. GODICI

*Attesting Officer*  *Acting Director of the United States Patent and Trademark Office*